H. R. FRISBIE.
Stench-Traps.
No. 210,196. Patented Nov. 26, 1878.
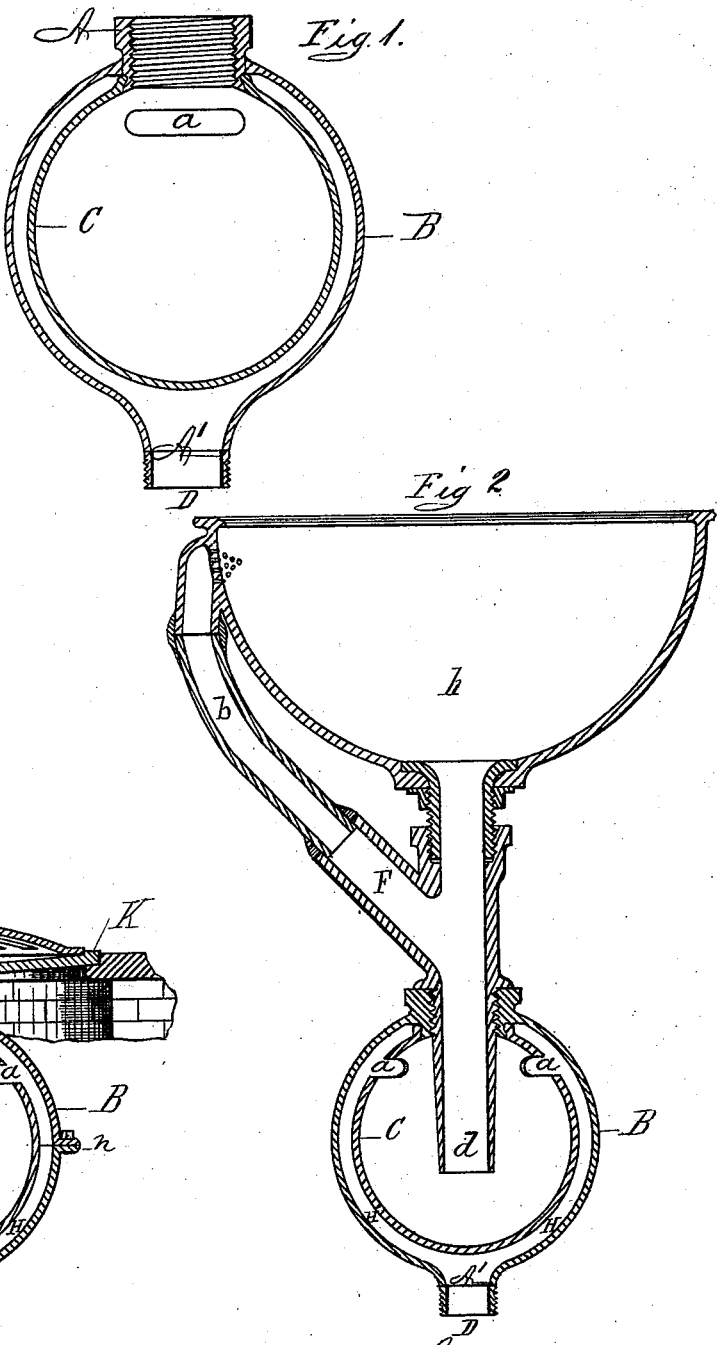

UNITED STATES PATENT OFFICE.

HENRY R. FRISBIE, OF BRIDGEPORT, CONNECTICUT.

IMPROVEMENT IN STENCH-TRAPS.

Specification forming part of Letters Patent No. 210,196, dated November 26, 1878; application filed October 26, 1878.

*To all whom it may concern:*

Be it known that I, HENRY R. FRISBIE, of Bridgeport, county of Fairfield, and State of Connecticut, have invented new and useful Improvements in Stench-Traps, which improvements are fully set forth in the annexed specification and in the accompanying drawing.

My invention relates to that class of traps which are connected to discharge-pipes leading from wash-basins, sinks, &c., and which are set in street-sewer openings to prevent the escape of any foul odors from sources beyond the trap, but allow an unobstructed flow of waste-water through them.

The object of my invention is to provide a trap that can be produced cheaply, be almost entirely made by casting, easily detached from its pipe-connections for cleaning, and which is free from liability to be "siphoned out," as it is termed by plumbers; and consists in making a stench-trap consisting of two spherical iron cases or globes, one within the other, both attached to a common connection or inlet leading to the interior of the inner globe, and constructed so as to leave a space between said globes for the reception and discharge through an opening in the bottom of the outer globe of such waste-water as may be discharged into the inner globe through a dip-pipe inserted therein, and which escapes from said inner globe through openings formed in the sides thereof above the lower end of said dip-pipe.

Referring to the drawing, Figure 1 is a view, in vertical section, of my improved trap, showing the inner globe with one of the discharge-openings. Fig. 2 is a vertical section of my trap through the discharge-openings of the inner globe, showing it connected to a basin. Fig. 3 is a vertical section of my trap as constructed for street-sewer openings, with a modified construction of the outside globe.

In the drawing, A is the inlet, and A' the outlet, pipe connection. B is the outer, and C is the inner, globe. D is the outlet in globe B. *a a* are discharge-openings in the sides of the inner globe. *d* is the dip-pipe. *b* is a waste-pipe leading from a basin. F is a basin-overflow branch. *h* is a basin. K is flange cast on the inlet-connection. *n n* are flanges on the two sections of globe B. P is a sewer-grate. H is a space between the inner and outer globe.

Like letters of reference refer to like parts in the different figures.

When my stench-trap is constructed so as to be connected into a line of pipe, as shown in Fig. 2, I construct it with a suitably-screwed inlet and outlet coupling attached thereto, to which said pipe can be screwed or otherwise secured; but when it is used in sewer-openings, and for other similar service, I make it with such or similar means of connecting it to a top grate and flange as are shown in Fig. 3, and leaving a proper waste-opening at the bottom of the outside shell. In constructing it for the first purpose above named, I prepare the inlet and outlet connections A and A' by cutting the requisite screw-threads in or upon them, and turning and tinning their outer surfaces at such places as will come in contact with the metal forming the shells B and C when said parts are united by casting, as hereinafter set forth. When constructed similar to the manner shown in Fig. 3, other methods of uniting or connecting the globes and the inlet-connection are resorted to, according to circumstances. After having prepared the inlet and outlet connections as above mentioned, I cast the inner globe, C, on a core provided with such a print projection as will permit of slipping connection A onto it, so that the core and the connection are laid together into the mold, and the inner globe is cast onto the connection, uniting to it on the tinned part thereof sufficiently near its lower end to leave room above it for the thickness of the outer globe, which is subsequently to be attached there. When the casting of the inner globe is completed as above described, I inclose said globe in a core of such thickness as I desire the space between the two globes to be when the last casting is completed; and said core leaves below the collar of inlet-connection A a tinned space wide enough for the thickness of the outer globe. Said core has made upon its lower end a print projection, upon which I place the outlet-connection A', prepared as above stated, in such a position that when the outer globe is cast the molten metal will unite to it, as well as to the connection A at the top. Thus the second and last casting produces a trap such as is shown in Fig. 1, ready to be attached to other parts, as shown in Fig. 2.

It is obvious that the construction of my trap does not involve the necessity of making it in any other way than by casting it by successive operations, as above described, for it may be cast at one operation by making such a chambered core for the outer globe as would provide for the formation of the inner globe within it; but in practice this is found to result in such a large proportion of imperfect castings that the first method proves to be the most economical.

When my trap is constructed in the manner shown in Fig. 3, I either cast the flange K, inlet-connection A, and dip-pipe $d$ in one piece, and bolt or otherwise secure both globes to it, or I cast the above-named parts—viz., K, A, and $d$—with the upper half of the outer globe divided between flanges $n$ $n$ in one piece. When cast in the last-named way, I bolt the inner globe up under the upper half of globe B to flange K, and subsequently bolt the lower half of the globe onto the upper one by bolts through flanges $n$ $n$. This latter construction is very useful and convenient for large traps, as it does not necessitate enveloping the inner globe in a core on which to cast the outer globe, and provides a convenient means for removing the inner globe from traps set in sewer-openings, if any necessity therefor should exist.

The operation of my trap is very simple, as will be readily seen, receiving waste-water through the dip-pipe $d$ into the inner globe, where, by the position of the discharge-openings $a$ $a$ above the end of said dip-pipe, water is caused to stand sufficiently above the lower end of said pipe to keep it constantly sealed, and so prevent the passage of any foul air from below the trap up by it.

For all practical purposes, it is obvious that other forms than spherical may be adopted for the principal parts B and C of my trap; but such a form as I show herein is best, all things considered.

What I claim as my invention is—

1. A stench-trap consisting of two metallic cases, C and B, arranged concentrically one within the other, leaving a space, H, between them, both secured to an inlet-connection, A, and having waste-outlets $a$ $a$ in globe C, and an outlet, D, in globe B, substantially as and for the purpose set forth.

2. The combination of the concentrically-arranged cases B and C, with a space, H, therebetween, and a dip-pipe, $d$, all constructed and arranged substantially as shown, and for the purpose set forth.

HENRY R. FRISBIE.

In presence of—
  F. L. HOLT,
  EDW. STEV. SUMNER.